US007680922B2

(12) United States Patent
Rabinovitch et al.

(10) Patent No.: US 7,680,922 B2
(45) Date of Patent: Mar. 16, 2010

(54) NETWORK SERVICE LEVEL AGREEMENT ARRIVAL-CURVE-BASED CONFORMANCE CHECKING

(75) Inventors: Peter Rabinovitch, Kanata (CA); Arnold Jansen, Ottawa (CA); Zlatko Krstulich, Ottawa (CA)

(73) Assignee: Alcatel Lucent, Paris (FR)

( * ) Notice: Subject to any disclaimer, the term of this patent is extended or adjusted under 35 U.S.C. 154(b) by 1460 days.

(21) Appl. No.: 10/696,034

(22) Filed: Oct. 30, 2003

(65) Prior Publication Data

US 2005/0097206 A1 May 5, 2005

(51) Int. Cl.
*G06F 15/173* (2006.01)
(52) U.S. Cl. .................................. 709/224; 709/223
(58) Field of Classification Search ................. 709/223, 709/224
See application file for complete search history.

(56) References Cited

U.S. PATENT DOCUMENTS

| 2002/0049841 | A1 * | 4/2002 | Johnson et al. | 709/225 |
|---|---|---|---|---|
| 2003/0135609 | A1 * | 7/2003 | Carlson et al. | 709/224 |
| 2004/0153563 | A1 * | 8/2004 | Shay et al. | 709/232 |
| 2004/0255151 | A1 * | 12/2004 | Mei et al. | 713/201 |

FOREIGN PATENT DOCUMENTS

| EP | 1 217 793 | 6/2002 |
|---|---|---|
| WO | WO 03/084134 | 10/2003 |

OTHER PUBLICATIONS

"Real-time SLA Montoring Tools" by Jamie Warter, NetworkWorld, Jan. 15, 2001. Retrieved from <http://www.networkworld.com/news/tech/2001/0115tech.html> on Sep. 22, 2008.*
N. Brownlee (The University of Auckland), Real Time Flow Monitor (RTFM), an Engineering Task Force (IETF) "Request for Comments: 2720" Memo, Oct. 1999 (pp. 1-48): http://www.ietf.org/rfc/rfc2720.txt?number=2720.
N. Brownlee (The University of Auckland), Real Time Flow Monitor (RTFM), an Engineering Task Force (IETF) "Request for Comments: 2721" Memo, Oct. 1999 (pp. 1-9): http://www.ietf.org/rfc/rfc2720.txt?number=2721.

(Continued)

*Primary Examiner*—Vivek Srivastava
*Assistant Examiner*—Ryan J Jakovac
(74) *Attorney, Agent, or Firm*—Kramer & Amado, PC

(57) ABSTRACT

A method and apparatus for assessing a communications' network adherence to Service Level Agreements (SLAs) is presented. The apparatus includes a arrival curve parameter derivation and arrival curve parameter reporting means. A arrival curve parameter generator may be implemented either in hardware for a predefined response in fitting arrival curves to cumulative content arrival variations, or in software for flexibility in the content traffic considered for assessment. The arrival curve generator may be associated with a physical port, a line card, or a network node. Arrival curve parameters defining arrival curves are employed by a Network Management System (NMS) in conjunction with communications network node and communications network service curves in performing SLA conformance assessments. The advantages are derived from a distributed content traffic characterization in terms of arrival curves, a reduced resource overhead in conveying arrival curve parameters without sacrificing SLA assessment thoroughness.

37 Claims, 3 Drawing Sheets

OTHER PUBLICATIONS

N. Brownlee et al (The University of Auckland et a;), Real Time Flow Monitor (RTFM), an Engineering Task Force (IETF) "Request for Comments: 2722" Memo, Oct. 1999 (pp. 1-42): http://www.ietf.org/rfc/rfc2720.txt?number=2722.

N. Brownlee (The University of Auckland), Real Time Flow Monitor (RTFM), an Engineering Task Force (IETF) "Request for Comments: 2723" Memo, Oct. 1999 (pp. 1-19): http://www.ietf.org/rfc/rfc2720.txt?number=2723.

N. Brownlee et al (The University of Auckland et al), Real Time Flow Monitor (RTFM), an Engineering Task Force (IETF) "Request for Comments: 2724" Memo, Oct. 1999 (pp. 1-16): http://www.ietf.org/rfc/rfc2720.txt?number=2724.

LeBoulec et al, "Network Calculus: A Theory of Deterministic Queuing Systems for the Internet", published by Springer Verlag as Lecture Notes in Computer Science No. 2050 and ISBN 3-540-42184-X.

R. L. Cruz, "Quality of Service Guarantees in Virtual Circuit Switched Networks", IEEE Journal On Selected Areas In Communications., vol. 13, No. 6, Aug. 1995 pp. 1048-1056.

Li Zhang et al., "Clock Synchronization Algorithms for Network Measurements", IEEE Infocom 2002, The Conference on Computer Communications, vol. 1, Jun. 23-27, 2002., pp. 160-.

J.Y. Leboudec, et al., Network Calculus,—A Theory of Deterministic Queuing Systems for the Internet, May 2004, pp. VI-XVIII, p. 3-34 and p. 86-97.

* cited by examiner

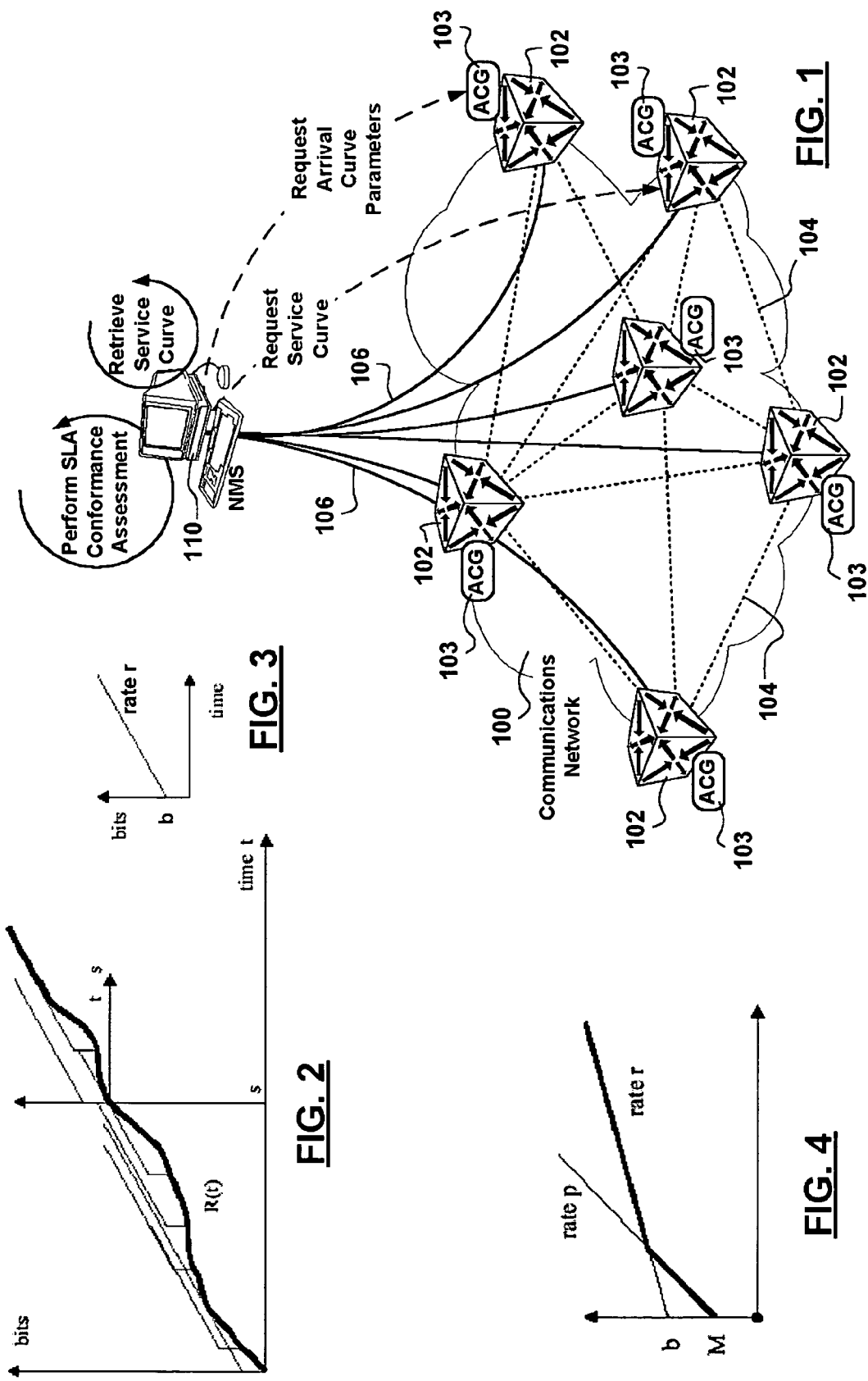

NETWORK SERVICE LEVEL AGREEMENT ARRIVAL-CURVE-BASED CONFORMANCE CHECKING

FIELD OF THE INVENTION

The invention relates to communications, and in particular to ensuring service provider conformance to service level agreements.

BACKGROUND OF THE INVENTION

In the field of communications, a Service Level Agreement (SLA) concerns agreed upon communications service provisioning terms and conditions between a communications services customer making use of communications services provided by a communications service provider. An exemplary SLA may specify communications service provisioning terms including, but not limited to: committed up-link and down-link rates, maximum up-link (and down-link) burst sizes, duration of schedule maintenance down time, availability, etc.

Communications services customers such as, but not limited to: individual users and organizations, negotiate SLAs with communications service providers. Service provider communications networks connect to backbone communications networks and other peer service provider communications networks to participate/provision wide area networked interconnectivity and in so doing negotiate SLAs therebetween.

Besides assessing an end customer's adherence to an SLA to ensure that the end customer adheres to his part of the agreement, a service provider has a duty to, and an interest in, assessing the service provider's own conformance to the customer's SLA to ensure that the service provider adheres to his part of the agreement in provisioning communications services to the end customer. Further, the service provider has an interest in assessing its conformance to SLAs established with backbone communications networks and peer service provider communications networks.

Today, conformance to SLAs is based on post-mortem assessments performed cyclically employing communications-network-attached statistics generator systems, typically at the end of each billing period. Statistics generator systems collect large amounts of content-traffic-related measurement reports, calculate: distributions, averages, means, medians, standard deviations, variances, covariances, etc., therefore generating large amounts of data to be retrieved from the statistics generators for interpretation. Problems with this approach stem from: the necessity for dedicated communications-network-attached statistics generator systems, a content-traffic-related raw measurements reporting bandwidth overhead, a storage overhead at the statistics generator system for tracking information, and archiving), a processing overhead, a statistics retrieval bandwidth overhead, etc. Statistics generator systems are relatively expensive particularly considering that each statistics generator system can only track measurement reports for a limited small number of communications network nodes (typically limited to three communications network nodes); communications network wide solutions requiring the use of large numbers of statistics generators simultaneously and are therefore unscalable.

It is intended that post-mortem assessment information be further used to renegotiate current SLAs, and as a basis for adjusting communication network node parameters possibly leading to infrastructure redeployment. Waiting for a billing cycle to complete, therefore represents a large stumbling block, the mitigation of which, currently includes making contingency provisions (leading to incurred overheads) for, but not limited to: spare bandwidth, spare storage resources, spare processing capacity, etc.

Further related developments include the use of a Network Management System (NMS) managing communication network nodes in a communications network (service provider communications network/backbone communications network). In accordance with a managed communications network deployment scenario, constituent communications network nodes provide raw reporting information derived from measurements to designated statistic generator systems. On a corresponding service cycle, each statistic generator system: extracts SLA-relevant reported measurement values, computes corresponding SLA conformance assessment parameters, and provides the NMS with the SLA conformance assessment parameter reports. The drawbacks of the deployment scenario include, but are not limited to: the necessity of dedicated statistic generator systems, the bandwidth overhead employed in conveying raw traffic measurement reports to statistics generators, the storage overhead in tracking the traffic measurement reports at each statistic generator, the processing overhead in deriving SLA conformance parameters, the bandwidth overhead expended in conveying SLA conformance parameter reports to the NMS, etc. The NMS, and the functions the NMS may provide, are still subject to the service cycles on which the statistics generators operate—end of each billing cycle.

Current developments include the Real Time Flow Monitor (RTFM), an Internet Engineering Task Force (IETF) initiative, Requests For Comments (RFCs) 2720, 2721, 2722, 2723, and 2724: memos discussing issues related to raw traffic flow measurement and raw measurement reporting. Generating and exporting measurements/statistics is an area of active current research within the IEFT Internet Protocol Flow Information eXport (IPFIX) working group. The proposal includes a traffic meter entity which monitors packets, extracts raw packet particulars, and makes a subset thereof available to a meter reader entity. While the proposed meter entity is intended monitor packets at line rate, the meter reader entity is expected to extract the measurements on a predefined schedule. The quantification of network performance is not a purpose of these memos.

The memos assumes that router entities or traffic monitor entities throughout a network are instrumented with meters to inspect traffic. Data reduction in producing requested traffic flow information is suggested to be exercised as near as possible to a traffic measurement point: to minimize the volume of data obtained and transmitted across a network for storage, and to reduce the amount of processing required in traffic flow analysis applications. In order to implement data reduction communications network operators are to be provided with the ability to specify traffic measurement requirements by writing "rule sets" describing what raw traffic specific particulars are to be collected while ignoring the rest. Therefore in accordance with the proposed solution, conformance assessment completeness is sacrificed in favor of reporting overhead savings. Further experimental work is on-going based on these memos.

Another recent development includes a theoretical treatise by J. Y. LeBoulec, and P. Thiran entitled "Network Calculus: A Theory of Deterministic Queuing Systems for the Internet" published by Springer Verlag as Lecture Notes in Computer Science No. 2050 and ISBN 3-540-42184-X. The theoretical investigation into communications network concepts assumes availability of complete communications network resource utilization statistics, and does not concern itself with: performing communications network resource utilization measurements, generating resource utilization statistics, conveying resource utilization statistics, nor with conveying SLA conformance reports in a communications network. As traffic measurement and reporting are current topics of research, the assumptions remain unfulfilled. Nevertheless, if raw traffic measurements were to be supplied in accordance with the RTFM initiative, a large bandwidth overhead and a large processing overhead would be incurred in conveying measurement reports to fulfill the assumptions.

Communications network (service provider/backbone) operators are looking for ways to monitor traffic patterns in real-time, assess service provider/backbone communications network conformance to SLA agreements, towards: enforcing SLA agreed-upon service provisioning characteristics, re-negotiating SLAs, and/or to re-configuring, and ultimately to re-deploying, the communications network infrastructure to support current and planed customer communication network resource utilization needs.

SLA conformance assessments are particularly important in conveying content in accordance with best-effort transport disciplines in non-deterministic packet switching communications networks such as Internet Protocol (IP) networks. Although connection-oriented/deterministic packet switching networks exist, such as Asynchronous Transfer Mode (ATM) networks which only establish end-to-end connections in accordance with pre-defined content transport parameters, assessing conformance to SLA agreements is also important for connection-oriented/deterministic packet switching communications networks as, typically, reserved resources are often over-provisioned, and therefore the available resources being less than optimally employed.

There therefore is a need to solve the above mentioned issues.

SUMMARY OF THE INVENTION

In accordance with an aspect of the invention, a method of characterizing a content traffic flow for communications network Service Level Agreement (SLA) compliance assessment is provided. Cumulative content arrivals are tracked in real time for the content traffic flow to derive a time variation of cumulative content arrivals. And, arrival curve parameters are adjusted in fitting an arrival curve to the variation of cumulative content arrivals for the content traffic flow. Tracking content traffic as received, fitting the arrival curve as content is being received enables distributed SLA-conformance-assessment-related processing in the communications network.

In accordance with another aspect of the invention, a physical port controller is provided. The physical port controller includes a hardware arrival curve generator successively fitting arrival curves to a time variation of cumulative content arrivals for a content traffic flow.

In accordance with a further aspect of the invention, a line card is provided. The line card includes arrival curve generation means successively fitting arrival curves to a time variation of cumulative content arrivals for a content flow.

In accordance with a further aspect of the invention, a communications network node is provided. The communications network node includes on of: a hardware arrival curve generator, and a software arrival curve generator. The communications network node successively performs an arrival curve fitting operation on a time variation of cumulative content arrivals for a content traffic flow.

In accordance with a further aspect of the invention, a method of assessing communications network conformance to a Service Level Agreement (SLA) in respect of a content traffic flow is provided. An arrival curve parameter report is received in respect of a tracked content traffic flow from a network node in real time. A resource utilization related value is computed based on the received arrival curve parameter report in respect of a content traffic flow pattern and at least one service curve. And, a communications network SLA conformance assessment is provided based on the computed resource utilization related value. Receiving arrival curve parameters only enables the provision of a real-time scalable communications network SLA conformance assessment solution.

In accordance with a further aspect of the invention, a method of selectively modifying communications network operational parameters to ensure that the resource utilization values compliance with agreed upon SLA resource utilization values is provided.

In accordance with a further aspect of the invention, a method of selectively modifying SLA specified resource utilization values ensuring that a current communications network operation is accommodated in the SLA is provided.

In accordance with a further aspect of the invention, a method of providing a proposal for traffic content redirection onto one of existing infrastructure and new to be deployed infrastructure is provided.

In accordance with a further aspect of the invention, a network management system is provided for performing a communications network SLA conformance assessment in respect of the content traffic flow.

In accordance with yet another aspect of the invention, a method of centrally assessing communications network conformance to a Service Level Agreement (SLA) in respect of a content traffic flow is provided. Cumulative content arrivals for the content traffic flow are tracked, in real-time, to derive a time variation of cumulative content arrivals at a communications network node. Arrival curve parameters corresponding to the content traffic flow are adjusted in fitting an arrival curve to the variation of cumulative content arrivals for the content traffic flow. Arrival curve parameters are reported in real time to a central entity assessing communications SLA conformance with respect to the content traffic flow. The central entity receives in real-time arrival curve parameter reports from the communications network node respecting the tracked content traffic flow. At least one resource utilization related value is computed based on the receive arrival curve parameter report in respect of a content traffic flow pattern and at least one service curve. And, a communications network SLA conformance assessment is provided based on the computed resource utilization related value. Employing arrival curve parameter reporting greatly reduces resource overheads in providing communications network SLA conformance assessments.

The advantages are derived from a distributed content traffic characterization in terms of arrival curves, a reduced resource overhead in conveying arrival curve parameters without sacrificing SLA assessment thoroughness.

BRIEF DESCRIPTION OF THE DRAWINGS

The features and advantages of the invention will become more apparent from the following detailed description of the preferred embodiment(s) with reference to the attached diagrams wherein:

FIG. 1 is a schematic diagram showing interconnected communications network elements participating in a managed communications network;

FIG. 2 is a schematic diagram showing exemplary variation in time of cumulative content being received and corresponding reported arrival curves in accordance with an exemplary embodiment of the invention;

FIG. 3 is a schematic diagram showing an exemplary arrival curve defined by two parameters reported in accordance with an exemplary implementation of the exemplary embodiment of the invention;

FIG. 4 is a schematic diagram showing another exemplary arrival curve defined by four parameters reported in accordance with another exemplary implementation of the exemplary embodiment of the invention;

Figure 5:
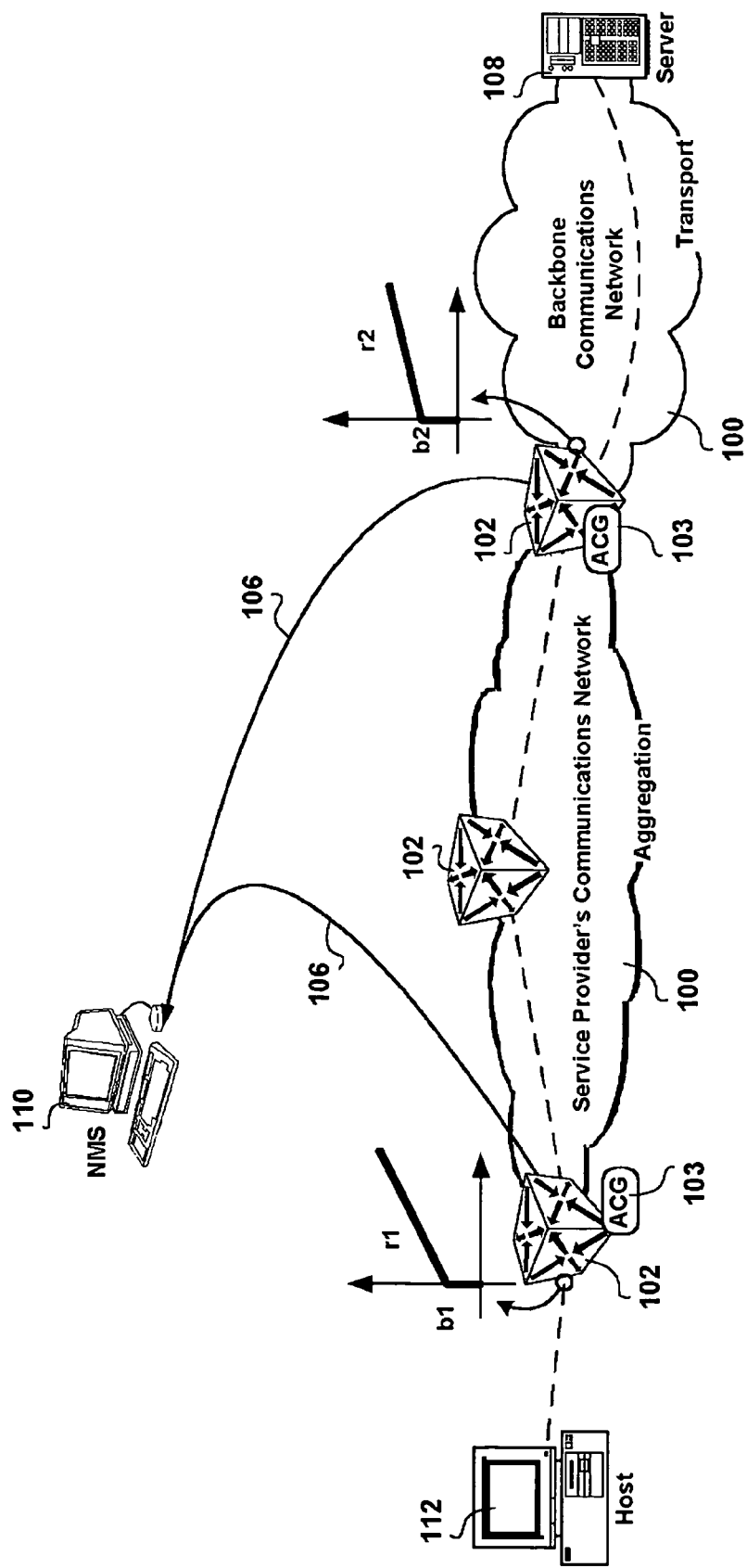
FIG. 5 is a schematic diagram showing, in accordance with the exemplary embodiment of the invention, exemplary communications network elements participating in a managed service provisioned over a managed communications network infrastructure, and process steps taken in assessing the communications network's conformance to a corresponding user SLA.

It will be noted that in the attached diagrams like features bear similar labels.

DETAILED DESCRIPTION OF THE EMBODIMENTS

A way to assess the ability of a communications network to provision services in conformance with a Service Level Agreement (SLA) is to: inject test traffic into the communications network via an access link, and monitor the response/reaction of the communications network to the test traffic. Implementing such a solution would require special purpose test equipment including, but not limited to: content generators, content traffic monitors, statistics generators, etc. all of which would incur additional expenses.

To minimize costs, a small number of packet generators and content traffic monitors would have to be moved from location to location to assess an overall behavior of the communications network, however such an overall behavior would only be approximate to real-time communications network behavior because such piece-meal testing would not measure synergistic responses/reactions of the communications network to communications traffic flow patterns when multiple sources concurrently convey multiple content flows to multiple sinks.

The synergistic response/reaction of the communications network by enlarge results in additional resource utilization when compared to resource utilization required for independent transport of content flows. As well the synergistic response/reaction of the communications network may result, although atypical, in a reduced resource utilization when compared to resource utilization required for independent transport of content flows. Traffic aggregation typically provides reduced resource utilization. It is hard to estimate the error introduced in such a piece-meal assessment by not considering synergistic responses/reactions of the communications network. Therefore contingency provisions must be made in operating a communications network to mitigate synergistic responses/reactions of the communications network, and as a result resource utilization overheads are incurred. Overheads are incurred even in the case in which no contingency provisions are provided in the atypical case because no advantage is taken of the reduced resource utilization.

In accordance with an exemplary embodiment of the invention, actual resource utilization is monitored in real time. Tracking actual resource utilization in real time, takes into consideration communications network resource utilization associated with the content being conveyed and synergistic resource utilization effects.

In accordance with the exemplary embodiment of the invention, the amount of information that is provided to an Network Management System (NMS), and the post-processing overhead required to obtain a (current) communications network conformance assessment in respect of an SLA must be reduced in order to provide scalable solutions.

Making reference to FIG. 1, in order for an NMS 110 to make informed decisions regarding how communications network nodes should behave, the NMS 110 needs, from the managed communications network nodes 102 themselves, real-time resource utilization information which characterizes the content conveyed as much as possible.

In accordance with the exemplary embodiment of the invention, a resource utilization information reporting method drastically reducing the amount of information to be employed by the nodes 102 to the NMS 110 is provided, thereby reducing the amount of resources (cost, bandwidth, processing, etc.) required in assessing conformance to SLAs.

In accordance with the exemplary embodiment of the invention, reporting bandwidth requirements are reduced by reporting content-traffic-conveyance characterizing information as opposed to raw traffic measurement information. One of the side benefits derived from Network Calculus is that arrival curves characterize content traffic to a high degree of completeness.

In accordance with the exemplary embodiment of the invention, presented in FIG. 1, individual interconnected (104) communications network nodes 102, constituent of an exemplary communications network 100, under the management and control of an NMS 110: track cumulative content arrivals as exemplary shown in FIG. 2; and compute arrival curves, and export 106 directly to the NMS 110, arrival curve parameters only, each arrival curve providing substantially complete information about a corresponding content traffic flow monitored. In tracking content arrivals, both content transport proper and synergistic effects are taken into account, typically without differentiating therebetween. Computing arrival curves at communications network nodes 102 distributes processing over the entire communications network. Exemplary arrival curve parameters are shown in FIG. 3, and FIG. 4 and explained herein below.

In accordance with the exemplary embodiment of the invention, it is desired that the exemplary arrival curves employed be defined by a small number of arrival curve parameters. Individual communications network nodes 102 monitor traffic conveyed therethrough in real time, and adjust, in real time, arrival curve parameters based on actual real time measurements. The exemplary arrival curve parameters represent characteristics of an individual monitored content traffic flow received at a monitoring communications network node 102 from a source network node either directly via an access link or indirectly via an intermediary adjacent communications network 100. A source is understood as a generator of content outside of the subject communications network 100 be it a communications network, connection, application layer content stream generator, or a physical/link layer transmitting port.

Arrival curve parameters characterizing a content traffic flow, shown in FIG. 3, include, without limiting the invention thereto: a "b" parameter representative of the degree of burst transmission, and an "r" parameter representative of a sustainable content conveyance rate. Additionally, arrival curve parameters, as shown in FIG. 4, may further include, without limiting the invention thereto: an "M" parameter representative of a maximum packet size, and a "p" parameter representative of a peak content conveyance rate. Arrival curve parameters represent quantities locally computed form real-time measurements and typically the (only) values reported to the NMS 110, the small number of which provide reporting bandwidth savings without sacrificing the completeness of information provided to the NMS 110. Fewer resources are required in the communications network 100 as the amount of information captured, conveyed, and processed by each communications network node 102 is reduced thus providing a scalable solution.

In accordance with the exemplary embodiment of the invention, based on reported arrival curve parameters only, the NMS 110 assesses the communications network's conformance to active SLAs. In assessing conformance to an SLA, the NMS 110 may derive additional SLA specific resource utilization parameters such as, but not limited to: a maximum incurred processing delay by the service corresponding to the SLA, a maximum buffer size allocation needed to provision the service corresponding to the SLA, etc. The NMS derived SLA specific resource utilization parameters may also be employed in assessing SLA conformance.

In accordance with the exemplary embodiment of the invention, in monitoring traffic conveyed via each communications network node 102, the communications network node 102 may employ existing traffic monitoring functions, typically associated with queuing received content, to track content arrivals. Various traffic monitoring functions are currently employed which track content arrivals for, but not limited to: physical ports, logical ports, trunks, connections, services, etc. For example, content arrivals for physical (and/or logical) ports and trunks are tracked in connection with buffering received content in input buffers. Exemplary content arrivals are tracked for provisioned end-to-end connections such as, but not limited to: virtual connections. Exemplary services for which content arrivals may be tracked include, but are not limited to: Virtual Private Network (VPN) provisioned services, and streaming services, such as but not limited to: net radio, Voice-over-IP services, etc. In accordance with the exemplary embodiment of the invention, at a bare minimum, monitoring content arrivals includes tracking received content at the packet and/or the bit level, and associating time stamps with measurements.

In accordance with the exemplary embodiment of the invention, arrival curve parameters are derived by a communications network node 102 from content arrival tracking information irrespective of the manner in which the content arrival tracking is implemented. Arrival curve parameters may be derived, as appropriate, in relation to a particular SLA either by hardware components associated with hardware employed in receiving content at the communications network node 102 and/or derived by software processes associated with various traffic management functions performed at the communications network node 102. All implementations of arrival curve parameter derivation means will be referred herein as Arrival Curve Generators (ACG) 103.

In accordance with the exemplary implementation of the exemplary embodiment of the invention, an arrival curve generator 103 is associated with input port logic tracking received content either directly as is the case in hardware-based implementations, or indirectly as is the case in software-based implementations.

Software-based arrival curve generator implementations require processing resources typically from a supervisory processor associated with a communications network node 102, although implementations having dedicated arrival curve processing resources (e.g. on a control card) are not excluded. Software-based arrival curve generator implementations provide implementation flexibility yet typically lack a defined response, which depending on particular applications may or may not be required. Various degrees of content arrival tracking can be provided on: per physical port basis, per physical link basis, per connection basis, per logical port, per content stream basis, per service basis, etc. While connection based tracking, logical port based tracking, and service based tracking, are best performed via software implementations due to the nature thereof, (e.g. difficulty to express the concept of "service" in hardware), these typically require a lot of resources in implementing thereof (e.g. related to interrupt processing, conveying large amounts of information via a communications network node system bus, etc.)

Hardware-based arrival curve generator implementations provide a deterministic response while reducing processing overheads including a reduced reliance on the communication network node 102 supervisory processor (e.g. reduced interrupt processing), and a reduced system bus bandwidth utilization; require dedicated circuitry and control logic, with a relatively more involved equipment validation as a drawback. A hardware implementation would provide content conveyance tracking on: per physical port basis, per physical link basis, per connection basis, etc. Hardware-based arrival curve generators 103 may be associated with a physical port (e.g. on a single chip physical port controller), a line card, an integral network node equipment unit (e.g. on a single chip switch device), etc.

In accordance with the exemplary embodiment of the invention, an arrival curve generator 103 performs a curve fitting function on cumulative content arrival measurements.

FIG. 2 is representative of a variation of cumulative content arrivals being received in real-time in respect of a particular flow of content. The heavy line represents a variation in total cumulative arrivals exemplary measured in valid received bits, bytes, words, double words, etc. A corresponding variation may also be tracked in respect of valid received packets associated with a particular flow of content. Also shown are multiple arrival curves being successively fitted, in real-time, the successive arrival curves bounding total cumulative content arrivals. The arrival curve generator 103 successively selects a best representative arrival curve, the defining parameters of which being reported to the NMS 110.

FIG. 2 shows two-parameter arrival curves being fitted successively. It is understood that arrival curves defined by any number of parameters may be fitted without limiting the invention. Exemplary factors which are typically considered in connection with a particular implementation include, but are not limited to: the processing bandwidth expended in fitting arrival curves, the bandwidth necessary in reporting arrival curve information to the NMS 110, the accuracy of information provided to the NMS 110, etc. These exemplary factors ultimately relate to the frequency of the arrival curve fitting operation. Typically the less frequent the curve fitting, the more arrival curves defined by a larger number of parameters are necessary, and a corresponding greater processing overhead is incurred at each communications network node. Establishing the balance is left to design choice and optimization for particular deployments and specific SLAs. Software-based arrival curve generators 103 provided a greater design freedom compared to hardware-based implementations. Guiding principles for the choice also need to consider between other things: that enough content arrival information is considered in fitting arrival curves to ensure statistical significance, expose (long term) steady state behavioral characteristics of a corresponding source as viewed through content arrivals, provide timely updates to expose fundamental statistical changes in content conveyance, etc.

In accordance with the exemplary embodiment of the invention, for an arrival curve generator 103 to be implemented in hardware, the simplest of arrival curves are preferred. The exemplary two-parameter representative arrival curve shown in FIG. 3 is described by a slope "r", and an ordinate intercept "b". Determining a best fit arrival curve in a hardware implementation is a challenge—solutions to which continue to be matters of intense current research described elsewhere. Guiding principles for hardware based curve fitting include the need to take into consideration that solutions employing integer arithmetic are preferred, as are solutions which do not make extensive use of division. Exemplary solutions include: shifted linear regression which is characterized by performing an ordinary linear regression and then shifting the intercept upward (higher ordinate intercept values) so that the cumulative arrivals curve lies entirely below (at least during the characterization time interval of the arrival curve); and convex hull fitting whereby a line is pivoted on a cumulative arrivals curve peak to ensure that the cumulative arrivals curve lies entirely below (at least during the characterization time interval of the arrival curve). Other arrival curve fitting methods may be employed by the arrival curve generator 103 without limiting the invention.

In accordance with the exemplary embodiment of the invention, computing arrival curve parameters at (managed) communications network nodes 102 in a communications network provides a distributed computational load over the entire communications network thereby reducing processing overheads at the NMS 110 in support of scalable solutions.

Depending on particular implementations of the exemplary embodiment of the invention, additional resource overhead reductions are provided due to the arrival curves themselves representing corresponding content traffic flows in statistical terms: as an arrival curve is successively updated, arrival curve reports may only be sent to the NMS 110 only if there is a drastic departure from previously reported arrival curve parameters. Arrival curve parameter reports may also be requested by the NMS 110 in order to update stale arrival curve parameters, update stale communications network SLA conformance reports, and/or confirm continued communications network conformance to a particular SLA. Arrival curve parameter reports may include a timestamp specifying a generation (network) time corresponding to an arrival curve fit performed.

In accordance with the exemplary embodiment of the invention, in assessing conformance to SLAs, upon receiving arrival curve parameters, the NMS 110 employs service curves corresponding to communications network nodes in conjunction with the arrival curve reported data (parameters, timestamp, etc.) to calculate Quality-of-Service (QoS) parameters, validate SLAs, etc.

Communications network node specific service curves are representative of the ability of individual communications network nodes 102 to process content therethrough. Communications network specific service curves are representative of the ability of communications networks 100 to convey content therethrough. Communications network node specific service curves are determined from a combination of network node equipment design characteristics and laboratory/controlled testing performed during development/manufacturing thereof. Typically service curves are kept in a storage associated with the NMS 110 from which the service curves are retrieved. Alternatively, each network node 102 may store its own service curve(s) providing thereof to the NMS 110 upon request and/or along with the first arrival curve parameter report. Communications network specific service curves are determined from an aggregate of communications network node service curves and may depend on content transport paths followed.

Service curves themselves may also be described in terms of a number of service curve parameters—the lower the number of service curve parameters the less of a computation overhead and storage resources the NMS 110 is subject to; typically the larger the number of service curve defining parameters, the more accurate/comprehensive the SLA conformance assessment. The decision regarding the number of service curve parameters employed in describing service curves is left to design choice and/or subject to particular deployment scenario needs.

Details regarding the theory and mathematics involved in the computation performed by the NMS 110 in assessing the communications network's conformance to SLAs are provided in the above referenced Network Calculus theoretical treatise, results of which are presented herein:

Making exemplary reference to FIG. 5, a host node 112 makes use of services provided by a server node 108 via service provider's communications network 100 providing access to communication services to the host node 112, and by extension providing aggregation/distribution services for the server node 108.

An access network node 102 on the edge of the communications network 100 associated with the host node 112: tracks content arrivals from the host node 112, and provides 106 corresponding arrival curve parameter reports to the NMS 110. In assessing SLA conformance in serving the host network node 112 (uplink conformance), exemplary "b1" and "r1" parameters are received (106) at the NMS 110 which convolves corresponding arrival curve Ac(b1,r1) with a service curve Sc1 corresponding to the access network node 102, the result being subsequently convolved with a service curve Sc2 of an exemplary intermediary network node 102 in the content transport path, the result being further convolved with a service curve Sc3 of an exit network node 102; the end result being ultimately subjected to agreements specified in a corresponding SLA.

The exit node 102 on the edge of the communications network 100 associated (either directly via an access link, or indirectly via an intermediary communications network) with the server node 108: tracks content arrivals from the server node 108, and provides 106 corresponding arrival curve parameter reports to the NMS 110. In assessing SLA conformance in serving the host network node 112 (downlink conformance), exemplary "b2" and "r2" parameters are received (106) at the NMS 110 which convolves arrival curve Ac(b2,r2) with service curve Sc3 corresponding to the edge node 102 associated with the server node 108, the result is subsequently convolved with service curve Sc2 of the exemplary intermediary network node 102 in the content transport path, the result being further convolved with service curve Sc1 of the access node 102; the end result being ultimately subjected to agreements specified in a corresponding SLA.

Determining the transport path taken is relatively straight forward for connection-oriented content transport as the information is either already available at the NMS 110 or connections may be traced. Greater difficulty arises in respect of transport paths taken by connection-less traffic. Typically bandwidth is reserved for connection-less traffic along predetermined paths in the communications network and a degree of confidence may be ascribed to a particular transport paths. Connection-less traffic transport paths may also be traced with a certain degree of confidence.

Figure 6:
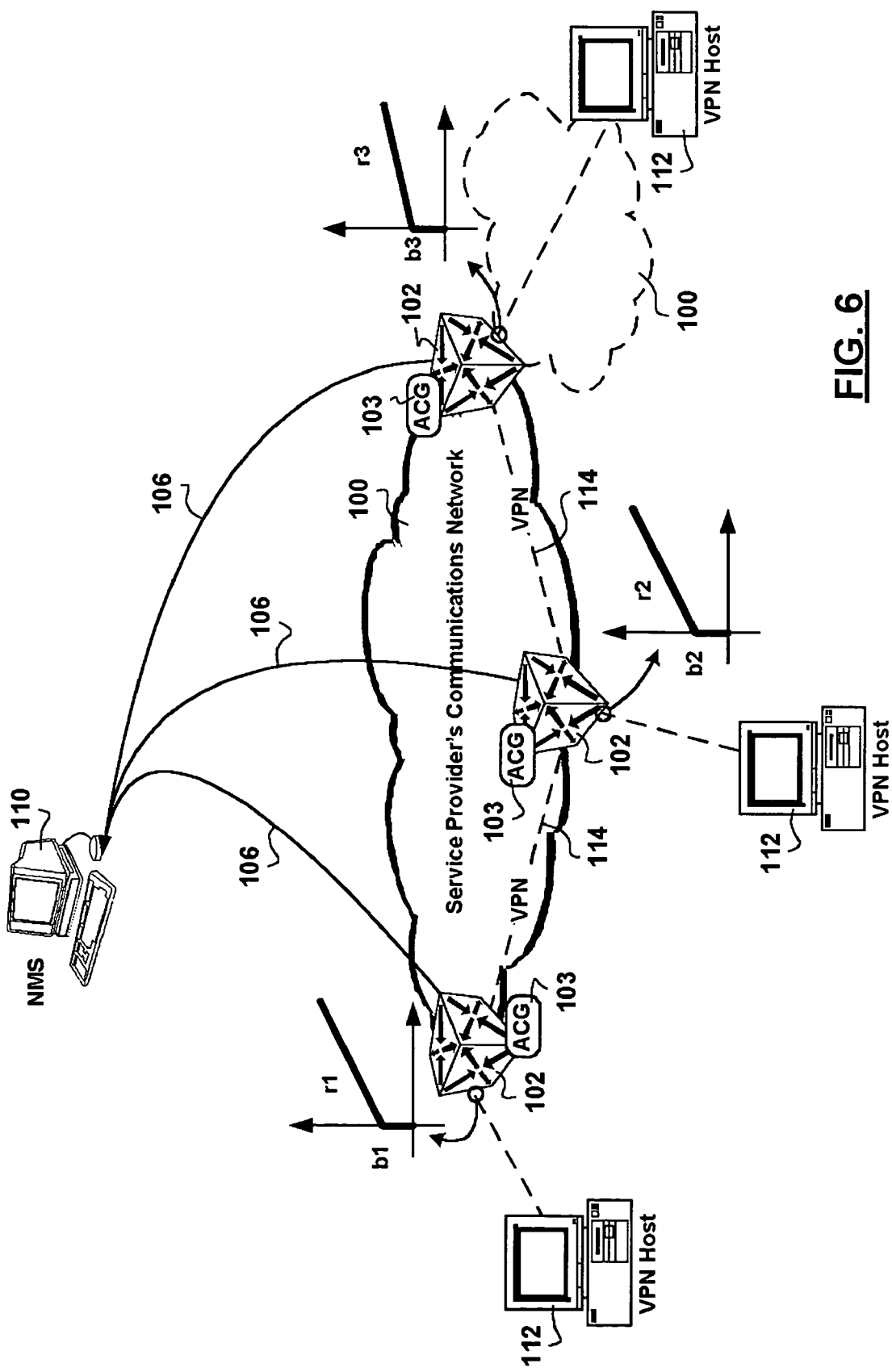
FIG. 6 is a schematic diagram showing, in accordance with the exemplary embodiment of the invention, exemplary communications network elements participating in a managed Virtual Private Network (VPN) service provisioned over a managed communications network infrastructure, and process steps taken in assessing the communications network's conformance to a corresponding service SLA.

Making reference to FIG. 6, Virtual Private Network (VPN) host nodes 112 subscribe to a VPN service provisioned (114) in a communications network 100 subject to a corresponding VPN SLA. A remote VPN host node 112 may be accessible only via another intermediary communications network 100; nevertheless, an access node 102 exists, in the subject service provider communications network 100, corresponding to the remote access node 102. Access nodes 102 corresponding to each VPN host 112, track content arrivals, and provide (106) the NMS 110 with exemplary arrival curve parameters {b1,r1}, {b2,r2}, and {b3,r3}. The NMS 110 employs VPN service provisioning information; arrival curves Ac(b1,r1), Ac(b2,r2), and Ac(b3,r3); and service curves Sc1, Sc2, and Sc3 in assessing the communication network's (fully meshed) VPN service provisioning conformance to the VPN SLA from VPN customer site to VPN customer site:

(Ac(b1,r1) O Sc1) O Sc2->VPN SLA;
((Ac(b1,r1) O Sc1) O Sc2) O Sc3->VPN SLA;
(Ac(b2,r2) O Sc2) O Sc1->VPN SLA;
(Ac(b2,r2) O Sc2) O Sc3->VPN SLA;
(Ac(b3,r3) O Sc3) O Sc2->VPN SLA; and
((Ac(b3,r3) O Sc3) O Sc2) O Sc1->VPN SLA.

It is understood that the NMS' 110 ability to determine which service curve convolution sequence to apply to an arrival curve is predicated on the identification of the customer, the identification of the customer's SLA, the identification of a content transport path in the communication network 100, etc. The identification of content transport paths 114 is dependent on the type of service provisioned: being predetermined and/or actively tracked for re-routable smart/switched virtual circuit type connections employed for connection oriented services. For the exemplary VPN service, transport paths 114 are tracked and optimized continuously exemplary employing the Institute of Electrical and Electronics Engineers (IEEE) 802.3 standard specified spanning tree protocol in Internet Protocol (IP) networks 100.

Incidentally a "communications network service curve" is understood to mean the "service curve of the communications network, as the communications network processes and conveys service content along a path between network nodes participating in provisioning the provisioned service".

Theoretically, employing Network Calculus in assessing conformance to SLAs provides deterministic guarantees: the NMS 110 will be able to guarantee with a high degree of confidence (substantially 100%) that an SLA is being adhered to. This is due to the fact that Network Calculus is based on max-min algebra which takes into consideration best-case/worst-case scenario considerations.

Employing Network Calculus, probabilistic guarantees can also be provided. For example, the NMS 110 will be able to guarantee with 99.9% confidence that a customer's end-to-end content transport delay is less than a particular delay amount which can be used in negotiating SLAs. As another example, probabilistic maximum buffer occupancies may be determined, information which may be used in reserving resources and/or deploying particular services in the communications network 100.

The embodiments presented are exemplary only and persons skilled in the art would appreciate that variations to the above described embodiments may be made without departing from the spirit of the invention. The scope of the invention is solely defined by the appended claims.

We claim:

1. A method of characterizing a content traffic flow at communication nodes of a communications network for communications network Service Level Agreement (SLA) compliance assessment by a network management system (NMS) connected to said communication nodes, the method comprising:

at least one of said communication nodes tracking cumulative content arrivals, in real time, for the content traffic flow to derive a time variation of cumulative content arrivals;

said at least one of said nodes adjusting characteristic arrival curve parameters, the arrival curve parameters comprising at least b, a degree of burst transmission, r, a sustainable content conveyance rate, M, a maximum packet size, and p, a peak content conveyance rate, in fitting an arrival curve to the variation of cumulative content arrivals for the content traffic flow; and said at least one of said nodes reporting said adjusted arrival curve parameters to said NMS to enable said NMS to carry out said SLA compliance assessment with respect to the content traffic flow, thereby reducing reporting bandwidth overhead by minimizing an amount of content arrival information communicated to said NMS.

2. The method of providing a content traffic flow characterization as claimed in claim 1, wherein reporting arrival curve parameters to the NMS is carried out in real time, and reporting is limited to arrival curve parameters only.

3. The method claimed in claim 1, further comprising:
said at least one of said nodes including a timestamp specifying the time of the arrival curve fit.

4. The method claimed in claim 1, further comprising:
said at least one of said nodes receiving a request for an arrival curve parameter update;
reporting arrival curve parameters to the NMS only in response to a request; and
further providing a reduction in the reporting bandwidth overhead.

5. The method claimed in claim 1, further comprising:
said at least one of said nodes tracking one of cumulative received packets, bits, bytes, words, and double words.

6. The method claimed in claim 1, further comprising:
said at least one of said nodes fitting the arrival curve in accordance with one of a shifted linear regression procedure, and a convex hull fitting procedure.

7. A method of assessing communications network conformance to a Service Level Agreement (SLA) in respect of a content traffic flow at communication nodes of a communications network, the method comprising:

receiving from at least one of said communication nodes an arrival curve parameter report in respect of a tracked content traffic flow in real time;

computing a resource utilization related value based on the received arrival curve parameter report in respect of a content traffic flow pattern and at least one service curve; and providing a communications network SLA conformance assessment to a network management system (NMS) based on the computed resource utilization related value, wherein receiving arrival curve parameters, the arrival curve parameters comprising at least b, a degree of burst transmission, r, a sustainable content conveyance rate, M, a maximum packet size, and p, a peak content conveyance rate, only enables the provision of a real-time scalable communications network SLA conformance assessment solution while reducing reporting bandwidth overhead by minimizing an amount of content arrival information communicated by said at least one of said nodes.

8. The method claimed in claim 7, further comprising:
the NMS requesting an arrival curve parameter report from said one of said nodes.

9. The method claimed in claim 7, further comprising:
retrieving the at least one service curve from storage in respect of the content traffic flow.

10. The method claimed in claim 7, further comprising:
retrieving the at least one service curve from said at least one node, said at least one node being in a path of the content traffic flow.

11. The method claimed in claim 7, further comprising:
retrieving from storage a sequence in which multiple service curves are to be combined with the arrival curve parameters in respect of the content traffic flow.

12. The method claimed in claim 7, further comprising:
discovering a sequence in which multiple service curves are to be combined with the arrival curve parameters in respect of the content traffic flow.

13. The method claimed in claim 7, further comprising:
computing Quality-of-Service (QoS) parameters.

14. The method claimed in claim 7, further comprising:
convolving an arrival curve respecting the received arrival curve parameters with a service curve.

15. The method claimed in claim 7, further comprising:
comparing the computed resource utilization related value with a corresponding agreed upon resource utilization value.

16. The method claimed in claim 7, further comprising:
selectively modifying communications network operational parameters to ensure that the resource utilization values comply with agreed upon SLA resource utilization values.

17. The method claimed in claim 7, further comprising:
selectively modifying SLA specified resource utilization values to ensure that the current communications network operation is accommodated in the SLA.

18. The method claimed in claim 7, further comprising:
providing a proposal for traffic content redirection onto one of existing infrastructure and new to be deployed infrastructure.

19. A method of centrally assessing communications network conformance to a Service Level Agreement (SLA) in respect of a content traffic flow at least one of a plurality of communication nodes of a communications network, the method comprising:
said at least one communication node tracking cumulative content arrivals for the content traffic flow, in real-time, to derive a time variation of cumulative content arrivals at a communications network node;
said at least one of said nodes adjusting arrival curve parameters, the arrival curve parameters comprising at least b, a degree of burst transmission, r, a sustainable content conveyance rate, M, a maximum packet size, and p, a peak content conveyance rate, in fitting an arrival curve to the variation of cumulative content arrivals for the content traffic flow;
said at least one node reporting, in real time, the arrival curve parameters to a network management system (NMS) assessing communications network SLA conformance with respect to the content traffic flow;
said NMS receiving an arrival curve parameter report in respect of a tracked content traffic flow from said at least one network node in real-time;
computing a resource utilization related value based on the received arrival curve parameter report in respect of a content traffic flow pattern and at least one service curve;
providing a communications network SLA conformance assessment based on the computed resource utilization related value; and
employing arrival curve parameter reporting reducing resource overheads in providing communications network SLA conformance assessments.

20. The method claimed in claim 19, further comprising:
said at least one of said nodes including a timestamp specifying the time of the arrival curve fit.

21. The method claimed in claim 20, further comprising:
said at least one of said nodes receiving a request for an arrival curve parameter update;
reporting arrival curve parameters to the NMS only in response to a request; and
further providing a reduction in the reporting bandwidth overhead.

22. The method claimed in claim 19, further comprising:
said at least one of said nodes tracking one of cumulative received packets, bits, bytes, words, and double words.

23. The method claimed in claim 19, further comprising:
said at least one of said nodes fitting the arrival curve in accordance with one of a shifted linear regression procedure, and a convex hull fitting procedure.

24. The method claimed in claim 19, further comprising:
requesting an arrival curve parameter report from said at least one of said nodes.

25. The method claimed in claim 19, further comprising:
retrieving the at least one service curve from storage in respect of the content traffic flow.

26. The method claimed in claim 19, further comprising:
retrieving the at least one service curve from said at least one node, said at least one node being in a path of the content traffic flow.

27. The method claimed in claim 19, further comprising:
retrieving from storage a sequence in which multiple service curves are to be combined with the arrival curve parameters in respect of the content traffic flow.

28. The method claimed in claim 19, further comprising:
discovering a sequence in which multiple service curves are to be combined with the arrival curve parameters in respect of the content traffic flow.

29. The method claimed in claim 19, further comprising:
computing Quality-of Service (QoS) parameters.

30. The method claimed in claim 19, further comprising:
convolving an arrival curve respecting the received arrival curve parameters with a service curve.

31. The method claimed in claim 19, further comprising:
comparing the computed resource utilization related value with a corresponding agreed upon resource utilization value.

32. The method claimed in claim 19, further comprising:
selectively modifying communications network operational parameters to ensure that the resource utilization values comply with agreed upon SLA resource utilization values.

33. The method claimed in claim 19, further comprising:
selectively modifying SLA specified resource utilization values to ensure that the current communications network operation is accommodated in the SLA.

34. The method claimed in claim 19, further comprising:
providing a proposal for traffic content redirection onto one of existing infrastructure and new to be deployed infrastructure.

35. The method as claimed in claim 1, wherein said tracking, adjusting, and reporting are carried out by more than one of said communication nodes.

36. The method as claimed in claim 7, wherein said arrival curve parameter report is received from more than one of said communication nodes.

37. The method as claimed in claim 19, wherein said tracking, adjusting, and reporting are carried out by more than one of said communication nodes, and said arrival curve parameter report is received from more than one of said communication nodes.

* * * * *